US012661633B2

(12) United States Patent
Neagu

(10) Patent No.: US 12,661,633 B2
(45) Date of Patent: Jun. 23, 2026

(54) MOISTURE REGULATING COMPOSITION AND SUPPORT MATERIAL CONTAINING SAID MOISTURE-REGULATION COMPOSITION

(71) Applicant: PHILIP MORRIS PRODUCTS S.A., Neuchatel (CH)

(72) Inventor: Cristian Neagu, Epalinges (CH)

(73) Assignee: Philip Morris Products S.A., Neuchatel (CH)

( * ) Notice: Subject to any disclaimer, the term of this patent is extended or adjusted under 35 U.S.C. 154(b) by 799 days.

(21) Appl. No.: 17/923,942

(22) PCT Filed: May 4, 2021

(86) PCT No.: PCT/EP2021/061758
§ 371 (c)(1),
(2) Date: Nov. 8, 2022

(87) PCT Pub. No.: WO2021/224281
PCT Pub. Date: Nov. 11, 2021

(65) Prior Publication Data
US 2023/0173458 A1     Jun. 8, 2023

(30) Foreign Application Priority Data
May 8, 2020     (EP) ..................................... 20173777

(51) Int. Cl.
B01J 20/22          (2006.01)
B01D 53/26          (2006.01)
(Continued)

(52) U.S. Cl.
CPC .......... B01J 20/226 (2013.01); B01D 53/261 (2013.01); B01D 53/28 (2013.01); B01J 20/24 (2013.01); B01J 20/28004 (2013.01); B01J 20/28035 (2013.01); B01J 20/28045 (2013.01); B01J 20/3208 (2013.01); B01J 20/3223 (2013.01);
(Continued)

(58) Field of Classification Search
None
See application file for complete search history.

(56) References Cited

U.S. PATENT DOCUMENTS

| | | | |
|---|---|---|---|
| 7,959,719 | B2 | 6/2011 | Powers |
| 8,569,407 | B2 | 10/2013 | Leung |

(Continued)

FOREIGN PATENT DOCUMENTS

| | | |
|---|---|---|
| CN | 103586011 | 2/2014 |
| CN | 105056896 | 11/2015 |

(Continued)

OTHER PUBLICATIONS

Hasturk et al., "Shaping of MOFs via Freeze-Casting Method with Hydrophilic Polymers and Their Effect on Textural Properties," Micoporous and Mesoporous Materials, vol. 295, Nov. 20, 2019.
(Continued)

*Primary Examiner* — Joseph D Anthony
(74) *Attorney, Agent, or Firm* — Mueting Raasch Group

(57) ABSTRACT
Moisture regulating composition comprising: 20-60 weight percent on total dry weight basis of at least one Metal-organic framework compound and 80-40 weight percent on total dry weight basis of at least one binder material.

24 Claims, 2 Drawing Sheets

(51) Int. Cl.

| | |
|---|---|
| *B01D 53/28* | (2006.01) |
| *B01J 20/24* | (2006.01) |
| *B01J 20/28* | (2006.01) |
| *B01J 20/32* | (2006.01) |
| *B65D 81/26* | (2006.01) |

(52) U.S. Cl.
CPC ....... *B01J 20/3246* (2013.01); *B01J 20/3297* (2013.01); *B65D 81/267* (2013.01); *B01D 2253/204* (2013.01)

(56)             References Cited

U.S. PATENT DOCUMENTS

| | | | | |
|---|---|---|---|---|
| 8,647,419 B2 * | 2/2014 | Kaskel | ................. | B01J 20/0237 |
| | | | | 2/457 |
| 8,771,770 B1 | 7/2014 | Crump | | |
| 2011/0010826 A1 * | 1/2011 | Kaskel | ................. | B01J 20/2803 |
| | | | | 2/457 |
| 2016/0166970 A1 * | 6/2016 | Boehringer | ............ | B01J 20/226 |
| | | | | 422/240 |
| 2017/0275076 A1 | 9/2017 | Edgington | | |
| 2022/0290877 A1 * | 9/2022 | Murphy | ................ | F24F 3/1429 |
| 2023/0173457 A1 * | 6/2023 | Neagu | .................... | B01J 20/046 |
| | | | | 206/204 |
| 2023/0173458 A1 * | 6/2023 | Neagu | .................. | B01D 53/261 |
| | | | | 206/204 |

FOREIGN PATENT DOCUMENTS

| | | |
|---|---|---|
| CN | 107029670 | 8/2017 |
| EP | 2502671 | 9/2012 |
| KR | 20170114382 | 10/2017 |
| KR | 102096333 | 4/2020 |
| WO | WO 2016/037043 | 3/2016 |
| WO | WO 2017/055970 | 4/2017 |
| WO | WO 2018/036997 | 3/2018 |
| WO | WO 2018/207072 | 11/2018 |
| WO | WO 2019/228356 | 12/2019 |

OTHER PUBLICATIONS

PCT Search Report and Written Opinion for PCT/EP2021/061758 dated Jul. 30, 2021 (17 pages).
Raj Manoj C. et al: "Preparation, characterization and hydrogen sorption study of MIL-101(Cr) pellets", International Journal of Environmental Studies, vol. 73, No. 3, May 3, 2016 (May 3, 2016), pp. 357-368.
Extended European Search Report for Application No. 20173777.2 dated Nov. 9, 2020 (12 pages).
International Preliminary Report on Patentability for PCT/EP2021/ 061758 dated Jul. 21, 2022 (9 pages).
Office Action issued in Korea for Application No. 10-2022-7042486 dated Feb. 4, 2026 (21 pages). English translation included.

* cited by examiner

MOISTURE REGULATING COMPOSITION AND SUPPORT MATERIAL CONTAINING SAID MOISTURE-REGULATION COMPOSITION

This application is a U.S. National Stage Application of International Application No. PCT/EP2021/061758 filed May 4, 2021, which was published in English on Nov. 11, 2021, as International Publication No. WO 2021/224281 A2. International Application No. PCT/EP2021/061758 claims priority to European Application No. 20173777.2 filed May 8, 2020.

The invention relates to a moisture regulating composition for regulating the relative humidity moisture in a desired closed environment, or for regulating a moisture content of a product, or for regulating the relative humidity inside a package.

The invention also relates to a support material containing a moisture regulating composition.

The invention further relates to a method for obtaining a support material provided with a moisture regulating composition.

A lot of products are produced or packaged with certain level of moisture content, but over time they tend to adsorb humidity from the environment. The adsorption of humidity damages the properties of the product. The organoleptic properties and also the physical properties of a product are degraded by an increase of the moisture content of the product.

Many products retain freshness or perception of freshness at a desired level of moisture content. Many products should be stored in desired conditions of relative humidity to maintain freshness.

It is therefore necessary to keep the moisture content of the products at a certain level for preserving the quality of the products until the final use of the products.

It is necessary to control the moisture content of the products throughout shipping, distribution, shelf-life and product usage life for optimising the property of the product until the final use. It is necessary to preserve the quality of the product to preserve the experience of the consumer and the satisfaction of the consumer.

For example, for a product contained in a package, it is desired to control the moisture content of the product before the opening and also during the use and until the last unit of product remains in the package.

In order to reduce the adsorption of humidity and to achieve a desired shelf-life, many different packaging solutions provided with different barrier materials for reducing the adsorption of humidity have been proposed.

On the other side, it is also necessary to avoid a too high desiccation of the product in the package, which would also damage the properties of the product.

In a first aspect, the invention provides a moisture regulating composition comprising: 20-60 weight percent on total dry weight basis of at least one Metal-organic framework compound and 80-40 weight percent on total dry weight basis of at least one binder material.

A moisture regulating composition is provided. The moisture regulating composition of the invention adsorbs water at a defined range of relative humidity.

In a second aspect, the invention provides a moisture regulating solution comprising a moisture regulating composition comprising: 20-60 weight percent on total dry weight basis of at least one Metal-organic framework compound and 80-40 weight percent on total dry weight basis of at least one binder material and such an amount of a solvent so as to obtain a moisture regulating solution in which the at least one Metal-organic framework forms between about 5 percent and about 40 percent of the total volume of the moisture regulating solution.

A moisture regulating solution is provided. The moisture regulating solution of the invention adsorbs water at a defined range of relative humidity.

In a third aspect of the invention it is provided a support material comprising a support material or plastic support material and a moisture regulating composition comprising: 20-60 weight percent on total dry weight basis of at least one Metal-organic framework compound and 80-40 weight percent on total dry weight basis of at least one binder material.

The support material allows the moisture content of a product positioned close to the support material to be kept in a predefined range.

According to a fourth aspect it is provided a method for preparing a support material containing a moisture regulating composition comprising 20-60 weight percent on total dry weight basis of at least one Metal-organic framework compound and 80-40 weight percent on total dry weight basis of at least one binder material, the method comprising the following steps:

providing a support material;

providing an impregnating bath containing a moisture regulating solution having a moisture regulating composition comprising 20-60 weight percent on total dry weight basis of at least one Metal-organic framework compound and 80-40 weight percent on total dry weight basis of at least one binder material and a solvent;

immersing the support material into the impregnating bath until the support material is impregnated with the solution of the impregnating bath and drying the support material to evaporate the solvent from the support material so as to obtain a support material comprising the at least one Metal-organic framework exhibiting a moisture content which would be in equilibrium at the temperature of 23 Celsius and the pressure of 1 atmosphere with a mixture air-water characterized by a relative humidity comprised between about 0 and 25 percent, according to the corresponding sorption isotherm of the at least one Metal-organic framework.

In a fifth aspect of the invention it is provided a method for preparing a support material containing a moisture regulating composition comprising 20-60 weight percent on total dry weight basis of at least one Metal-organic framework compound and 80-40 weight percent on total dry weight basis of at least one binder material, the method comprising the following steps:

providing a support material;

providing an impregnating bath containing a moisture regulating solution having a moisture regulating composition comprising 20-60 weight percent on total dry weight basis of at least one Metal-organic framework compound and 80-40 weight percent on total dry weight basis of at least one binder material and a solvent;

immersing the support material into the impregnating bath until the support material is impregnated with the solution of the impregnating bath and drying the support material to evaporate the solvent from the support material so as to obtain a support material comprising the at least one Metal-organic framework exhibiting a moisture content comprised between about 0 weight percent and 25 weight percent based on the weight of the at least one Metal-organic framework without water.

It is thus obtained a support material suitable for regulating the moisture content of a product or for regulating the relative humidity of a closed environment.

The moisture regulating composition, the moisture regulating solution and the support material may be used for controlling the moisture content of a product and for keeping the moisture content of the product within a defined range. It is therefore possible to preserve the quality of a product.

The moisture regulating composition allows to keep the relative humidity in a closed environment, like for example a package, within a predefined range.

The moisture regulating composition and the moisture regulating solution may be used for keeping the relative humidity in the package within a defined range. It is therefore possible to keep the moisture content of a product packed in the package within desired range. It is therefore possible to preserve the quality of the product.

For some products, the customers have a bad experience, either when the water content of the products increases over a certain level or also when the moisture content is too low. Thanks to the moisture regulating composition of the invention it is possible to keep the moisture content of a product within a predefined range, thus optimising the organoleptic properties of the product and the experience for the consumer of the product.

By properly choosing the weight percent of the at least one Metal-organic framework, the weight percent of the at least one binder in the moisture regulating composition, it is possible to adjust the moisture content of a support material or the moisture content of a product within a desired range.

By properly choosing the type of the at least one Metal-organic framework, the type of the at least one binder, or both in the moisture regulating composition, it is possible to adjust the moisture content of a product positioned close to the support material within a desired range.

It is thus avoided an undesired increasing of the moisture content in the product over a desired range.

It is thus avoided, on the contrary, an undesired decrease of the moisture content of the product below a desired range.

The deterioration of the product is thus avoided, and the quality of the product is preserved.

Similarly, by properly choosing the type or weight percent of the Metal-organic framework, or the type or weight percent of the at least one binder in the moisture regulating composition, it is possible to adjust the relative humidity in the package within a desired range.

It is thus possible to obtain packages configured to keep the relative humidity inside the packages within a predefined range. Obtained packages are configured for keeping the moisture content of a product packed in the packages within a predefined range.

The moisture regulating composition adsorbs water in a defined relative humidity range, indicated as adsorption range in the following. In other words, the moisture regulating composition adsorbs water in a defined range of relative humidity comprised between approximately a minimum threshold value of relative humidity and approximately a maximum threshold value of relative humidity.

The relative humidity range in which the moisture regulating composition adsorbs water depends on the Metal-organic framework or Metal-organic frameworks used, and/or on the binder or binders used in the moisture regulating composition.

The moisture regulating composition adsorbs only limited quantity of water below the minimum threshold value of relative humidity. The moisture regulating composition adsorbs only limited quantity of water above the maximum threshold value of relative humidity.

The moisture regulating composition adsorbs a considerable quantity of water in the adsorption range, i.e. in the range or relative humidity between the minimum threshold value of relative humidity and the maximum threshold value of relative humidity. By choosing the Metal-organic framework or Metal-organic frameworks, the type of binder or binders the minimum threshold value of relative humidity and the maximum threshold value of relative humidity are adjusted and thus the relative humidity values of the adsorption range are adjusted.

It is thus possible to adjust the moisture content of a product.

By choosing the Metal-organic framework or Metal-organic frameworks, the type of binder or binders it is possible to obtain a moisture regulating composition tuned to adsorb a certain amount of water and within a certain minimum threshold value of relative humidity and maximum threshold value of relative humidity.

Hence, by choosing the Metal-organic framework or Metal-organic frameworks, the type of binder or binders, and using the desired ratio of the at least one Metal-organic framework and at least one binder it is possible to obtain a moisture regulating composition characterized by an S-shape in the sorption isotherm that fits the desired range of relative humidity in which the moisture regulating composition substantially absorbs water.

By choosing Metal-organic framework or Metal-organic frameworks and the type of binder or binders, it is adjusted the relative humidity range at which the moisture regulating composition substantially adsorbs water.

Therefore, by choosing Metal-organic framework or Metal-organic frameworks, the type of binder or binders, it is adjusted the moisture content of a support material comprising the moisture regulating composition or the relative humidity inside a package comprising the moisture regulating composition or the moisture content of a product packed in a package comprising the moisture regulating composition.

It is possible to control the moisture content of a product in a package before the opening and also during the use and until the last unit of product remains in the package. It is possible to control the moisture content of a product even under different conditions of environmental relative humidity.

It is also possible to avoid a too high desiccation of the product in the package and also a too high moistening of the product in the package.

Choosing the at least one Metal-organic framework or the Metal-organic frameworks and the binder or binders, it is possible to obtain a moisture regulating composition that is suitable for a particular product, keeping the moisture content of the product at the level desired for that product.

In the adsorption range the moisture regulating composition adsorbs water with an efficiency depending on the used Metal-organic framework or Metal-organic frameworks and on the used binder or binders.

In the adsorption range the amount of water adsorbed by the moisture regulating composition depends on the used Metal-organic framework or Metal-organic frameworks and on the used binder or binders.

At a defined temperature the adsorption behaviour of a compound is represented by a curve indicated as sorption isotherm, showing the change in the percent of water adsorbed/desorbed versus the percent of equilibrium relative humidity. The sorption isotherm is obtained at a certain Temperature and pressure and indicates the percent of the water adsorbed/desorbed by the moisture regulating composition as a function of the percent equilibrium relative humidity.

The sorption isotherm of the moisture regulating composition has a sigmoidal path, i.e. a curve resembling the shape of a "S".

The sorption isotherm of the moisture regulating composition has a first portion comprised between zero relative humidity and the minimum threshold value of relative humidity. In the first portion the moisture regulating composition adsorbs low quantities of water and the water adsorbs has a gradual increase in dependence of the relative humidity. The quantity of adsorbed water depends on the Metal-organic framework or Metal-organic frameworks and on the binder or binders used in the moisture regulating composition. The value of the threshold minimum value of relative humidity depends on the Metal-organic framework or Metal-organic frameworks and on the binder or binders used in the moisture regulating composition.

The sorption isotherm of the moisture regulating composition has a second portion comprised between the maximum threshold value of relative humidity and about one hundred percent of relative humidity. In the second portion the moisture regulating composition adsorbs low quantities of water and the water adsorbed has a gradual increase in dependence of the relative humidity. The quantity of adsorbed water depends on the Metal-organic framework or Metal-organic frameworks and on the binder or binders used in the moisture regulating composition. The value of the maximum threshold relative humidity depends on the Metal-organic framework or Metal-organic frameworks and on the binder or binders used in the moisture regulating composition.

The sorption isotherm of the moisture regulating composition further comprises an adsorption portion comprised between the minimum threshold value of relative humidity and the maximum threshold value of relative humidity. In the adsorption portion the moisture regulating composition adsorbs higher quantities of water in relation to the first portion or the second portion. In the adsorption portion the water adsorbed has a high increase in dependence of the relative humidity. The quantity of adsorbed water depends on the Metal-organic framework or Metal-organic frameworks and on the binder or binders used in the moisture regulating composition.

The minimum threshold value of relative humidity may be comprised between about 15 and 45 percent, at a temperature of about 23 Celsius and at a pressure of 1 atmosphere. The minimum threshold value of relative humidity may be preferably comprised between about 20 and 40 percent, at a temperature of about 23 Celsius and at a pressure of 1 atmosphere.

The maximum threshold value of relative humidity may be comprised between 25 and 70 percent at a temperature of about 23 Celsius and at a pressure of 1 atmosphere. The maximum threshold value of relative humidity may be preferably comprised between 30 and 55 percent at a temperature of about 23 Celsius and at a pressure of 1 atmosphere.

The water adsorbed in the adsorption portion may be comprised, for example, between about 5 and about 105 percent, expressed as ratio in relation to the weight of the Metal-organic framework or Metal-organic frameworks: grams of water/grams of Metal-organic framework or Metal-organic frameworks.

The Metal-organic frameworks are compounds very efficient in adsorbing water.

The at least one Metal-organic framework may be Aluminium Fumarate ($C_{12}H_6Al_2O_{12}$).

The at least one Metal-organic framework may be chosen in the group of the chromium terephthalate Metal-organic frameworks MIL-101(Cr), comprising trimeric chromium (III) octahedral clusters interconnected by 1,4-benzenedicarboxylates and having empirical formula [$Cr_3(O)X(bdc)_3$ $(H_2O)_2$], wherein bdc is benzene-1,4-dicarboxylate and X is OH or F. In a version, the Metal-organic frameworks MIL-101(Cr) has the general formula ($Cr_3O(OH)(H_2O)_2(bdc)_3$).

The at least one Metal-organic framework may be chosen in the group of the functionalized chromium terephthalate Metal-organic frameworks, MIL-101(Cr)—X, where X denotes an electron withdrawing (NO2, $SO_3H$ or Cl) or electron donor ($NH_2$ or $CH_3$) group.

The at least one Metal-organic framework may be chosen in the group of the amino-functionalized chromium terephthalate Metal-organic frameworks, MIL-101(Cr)—$NO_2$.

The at least one Metal-organic framework may be chosen in the group of the group of the iron terephthalate Metal-organic frameworks, MIL-101(Fe).

The at least one Metal-organic framework may be chosen in the group of the chromium-based Metal-organic frameworks with underlying soc topology Cr-soc-Metal-organic framework-1 with chemical formula [$Cr_3(\mu3-O)(H_2O)2$ (TCPT)1.5Cl] where TCPT is tetratopic 3,3",5,5"-tetrakis (4-carboxyphenyl)-p-terphenyl ligand.

The at least one Metal-organic framework may be chosen in the group of the isostructural Zr(IV)-MOFs with rare low-symmetric 9-connected Zr6 clusters MOFs, indicated as Zr(IV)-MOFs BUT-46F, BUT-46A, BUT-46W, and BUT-46B), preferably Zr(IV)-MOFs BUT-46A.

The at least one Metal-organic framework may be chosen in the group of the hybrid microporous highly connected rare-earth-based Metal-organic frameworks Y-shp-MOF-5, where "shp" denotes square hexagonal prism.

The moisture regulating composition may comprise a plurality of Metal-organic frameworks compounds chosen in any one of the groups indicated above.

The moisture regulating composition or the moisture regulating solution may comprise Aluminium Fumarate and Mil-101 (Cr).

The moisture regulating composition or the moisture regulating solution may comprise Aluminium Fumarate and Mil-101 (Fe).

The moisture regulating composition or the moisture regulating solution may comprise about 50 weight percent of Aluminium Fumarate and about 50 weight percent of Mil-101 (Fe), based on the total Metal-organic framework compounds weight.

It is to be understood that any other possible Metal-organic framework may be used in the moisture regulating composition or in the moisture regulating solution.

By choosing the appropriate Metal-organic framework or the appropriate Metal-organic frameworks it is possible to adsorb water at a desired adsorption range and to maintain the moisture content at a desired level.

The at least one binder is a water-soluble carrier for improving the solubilisation of the at least one metal-organic framework.

The provision of the binder allows the adsorption action to be improved. Further, the presence of the binder increases the coupling of the moisture regulating composition to a desired support material The binder improves the coupling of the at least one metal-organic framework on the support material or on the packaging material. The binder allows the water to reach the at least one metal-organic framework so as to enhance the adsorption of water from the at least one metal-organic framework. The binder also avoids that the adsorption capacity of the at least one metal-organic framework is impaired.

The at least one binder of the moisture regulating composition or of the moisture regulating solution may be chosen in a group comprising: starch $((C_6H_{10}O_5)n\text{-}(H_2O))$, carboxymethyl cellulose (CMC, $C_6H_7O_2(OH)$ $2CH_2COONa$), alginic acids $((C_6H_8O_6)n)$, alginates, copolymers of polyacrylic acid $((C_3H_4O_2)n)$, copolymers of methacrylic acid $(C_4H_6O_2)$, polymers and/or copolymers of maleic acid $(HO_2CCH=CHCO2H)$, polyaspartic acid $((C_4H_5NO_3)n)$, hydroxyethylcellulose $(C_{29}H_{52}O_{21})$, hydroxypropylcellulose $(C_{36}H_{70}O_{19})$, polyvinylalcohol $((C_2H_{40})x)$, polyvinylalcohol-co-ethylene (EVOH, $C_4H_{80}$), polyvinylalcohol-co-vinyl acetate, polyethylene oxide $((-CH_2CH_2O\text{-})n)$, polyethyleneoxide-co-propyleneoxide.

The moisture regulating composition or the moisture regulating solution may comprise a plurality of binders, for example a combination of the compounds indicated above.

The provision of the binder allows to improve the application of the at least Metal-organic framework or Metal-organic frameworks on the support material.

The at least one binder may be a water-soluble carrier for improving the solubilisation of the at least one Metal-organic framework.

The at least one binder of the moisture regulating composition or the moisture regulating solution may be potato starch.

It is to be understood that any other possible binders may be used in the moisture regulating composition or the moisture regulating solution.

The moisture regulating composition may comprise Aluminium Fumarate and potato starch.

The moisture regulating composition may comprise MIL-101 (Cr) and potato starch.

The quantity of solvent in the moisture regulating solution is adjusted in order to dilute the moisture regulating composition to be able to mix and disperse the at least one Metal-organic framework and the at least one binder.

The quantity of solvent in the moisture regulating solution is adjusted in order to obtain a solution having a viscosity in a range that is suitable for applying the moisture regulating solution by coating or impregnation on a support material.

The moisture regulating solution may comprise water as solvent that dissolves the moisture regulating composition in the moisture regulating solution.

Different solvents can also be used in a moisture regulating solution of the invention.

The solvent is compatible with the at least one binder and the at least one Metal-organic framework so as to effectively dissolve the at least one binder and the at least one Metal-organic framework.

In some version the moisture regulating solution comprises a plurality of solvents for dissolving the at least one binder and the at least one Metal-organic framework.

The moisture regulating solution comprises advantageously between about 5 percent and about 35 percent of the total volume of the moisture regulating solution of the at least one Metal-organic framework or Metal-organic frameworks.

In the moisture regulating solution the at least one Metal-organic framework may form between about 10 percent and about 30 percent of the total volume of the moisture regulating solution.

In the moisture regulating solution the at least one Metal-organic framework may form between about 15 percent and about 25 percent of the total volume of the moisture regulating solution.

In a version the moisture regulating solution comprises water as solvent, and between about 20 and percent 40 percent of the total volume of the moisture regulating solution of Aluminium Fumarate as Metal-organic framework. Preferably, the moisture regulating solution comprises between about 25 percent and about 35 percent of the total volume of the moisture regulating solution of Aluminium Fumarate; most preferably about 32 percent of the total volume of the moisture regulating solution of Aluminium Fumarate.

The support material may be used for wrapping a product maintaining the moisture content of the product at a predefined range.

The support material may be used for obtaining packages allowing to maintain the relative humidity in the package and the moisture content of a product packaged in the packages at a predefined range. The support material may be used for obtaining any part of a package. The support material of the invention may be used for obtaining different types of packages.

The support material may be a packaging material, used for obtained a package of a desired product.

The support material may be used for obtaining a package for a tobacco containing product.

The support material may be used for obtaining a package for a Heat not burn tobacco containing product.

The support material may comprise a fiber-based material.

The support material may comprise plastic material.

The support material may be chosen in a group comprising paper, paperboard, textiles, fabrics, non-woven materials, polymers, polymer foams and polymer films.

The type of support material may be chosen in dependence of the package to be obtained.

It is to be understood that other type of support materials comprising the moisture regulating composition may be used.

The support material may be a paper with a grammage range between about 20 to about 200 grams per square meter.

The support material may be a paperboard with grammage between about 180 to about 300 grams per square meter.

The support material may comprise an amount of moisture regulating composition comprised between about 20 to 300 grams per square meter.

The support material may be a foamed support material. The foamed support material may be prepared from biopolymers, like for example starch, protein, cellulose.

In order to prepare the foamed support material, the moisture regulating composition and additionally at least one modifier are provided to be added to the support material. For example, wood pulp fibres, starch plasticisers like for example glycerol, water may be added to the support material as modifiers.

Then the steam foaming is carried out for causing the formation of a foamed support material.

Thereafter, a hot press moulding or a steam-based extrusion is performed to obtain the foamed material in the desired form.

A foamed support material is obtained having a density in the range between about 10000- to about 900000 grams per cubic meter.

The support material may comprise an amount of the Metal-organic framework or Metal-organic frameworks comprised between about 0.30 grams (±20%) and about 5.00 grams (±20%).

The support material may comprise an amount of the Metal-organic framework or Metal-organic frameworks comprised between about 0.50 grams (±20%) and about 2.50 grams (±20%).

The support material may comprise an amount of Metal-organic framework or Metal-organic frameworks comprised between about 0.75 grams (±20%) and about 1.50 grams (±20%).

In an embodiment, the support material comprises at least 1.00 gram (±20%) of Metal-organic framework or Metal-organic frameworks.

The quantity of the Metal-organic framework or Metal-organic frameworks depends on the product to be wrapped or confectioned with the support material and on the quantity of the product in the package obtained.

Advantageously, the support material comprises a quantity of at least one Metal-organic framework or Metal-organic frameworks so that in the package obtained with the support material the weight ratio between the at least one Metal-organic framework or Metal-organic frameworks and the product packaged in the package is comprised between 1:6 and 1:2.

Advantageously, the support material comprises a quantity of the at least one Metal-organic framework or Metal-organic frameworks so that in the package obtained with the support material the weight of the at least Metal-organic framework or Metal-organic frameworks is between about 10 percent and about 50 percent of the weight of the product packaged in the package.

The support material may comprise about 1.00 gram (±20%) of Aluminium Fumarate.

The support material may comprise about 1.00 gram (±20%) of MIL-101 (Cr).

The support material may comprise about 1.00 gram (±20%) of MIL-101 (Fe).

The support material may comprise about 0.50 grams (±20%) of MIL-101 (Cr) and about 0.50 grams (±20%) of Aluminium Fumarate.

These quantities of moisture regulating composition in the support allow the relative humidity to be kept in a predefined range of relative humidity, for example in the case of cigarette packages and in the case of packages of Heat-Not-Burn tobacco products. These quantities of moisture regulating composition allow to efficiently adsorb water.

The support material comprises the moisture regulating composition with a relative weight ratio between Metal-organic framework:binder comprised between 1:4 and 3:2.

These ratios allow an efficient adsorption of the water and to efficiently keep the relative humidity at the desired range.

The support material may be impregnated with the moisture regulating composition. A wet impregnation process, or a dry impregnation process may be used.

For applying the moisture regulating composition to a support material a dry impregnation process based on the use of an alternating electric field to charge the powder particles of the at least one Metal-organic framework allows to deposit the at least one Metal-organic framework on all kind of porous support material, including nonwoven materials, fabrics, papers and foams.

The dry impregnation method allows a moisture regulating composition in powder form to be impregnated in the support material.

The dry impregnation may be executed for example by means of high intensity alternating electric fields. Any other dry impregnation method known in the field and suitable for the support material in use may be used.

Any wet impregnation method known in the field and suitable for the support material in use may be used as well.

Impregnating the moisture regulating composition into the support material allows the moisture regulating composition to be distributed throughout the thickness of the support material.

The support material may comprise a coating layer containing the moisture regulating composition.

The support material may comprise a plurality of coating layers containing the moisture regulating composition.

The coating layer may be formed by the moisture regulating composition.

The support material may be coated with the moisture regulating composition forming a coating layer on the support material. The coating layer may be formed with any method and apparatus known in the art, for example any method of surface coating.

In this way, one surface of the support material adsorbs water in a very efficient way.

The support material may be provided with two different coating layers containing the moisture regulating composition provided on opposite side of the support material so that the support material in interposed between the two coating layers.

The support material may comprise at least one layer of moisture regulating composition having a thickness comprised between about 10 micrometres and about 80 micrometres, preferably between about 15 micrometres and about 70 micrometres, more preferably between about 20 micrometres and about 60 micrometres.

The support material may be a packaging material used as packaging element in a package.

In this way, it is not necessary to modify the aspect or the design of the package to obtain a package adjusting the moisture content of the product packaged therein.

A package may comprise at least one packaging element made of a support material comprising the moisture regulating composition.

A package may comprise a plurality of packaging elements made of a support material comprising the moisture regulating composition.

Additionally, a support material comprising the moisture regulating composition may be added to a package, for example inserted into the package.

A package comprises preferably an amount of the Metal-organic framework or Metal-organic frameworks comprised between about 0.30 and about 5.00 grams. The package comprises more preferably an amount of the Metal-organic framework or Metal-organic frameworks comprised between about 0.50 and about 2.50 grams. The package may comprise an amount of Metal-organic framework or Metal-organic frameworks comprised between about 0.75 and about 1.50 grams.

Advantageously, the package comprises a quantity of Metal-organic framework or Metal-organic frameworks so that the weight ratio between the at least one Metal-organic framework or Metal-organic frameworks and the product packaged in the package is comprised between 1:6 and 1:2.

Advantageously, the package comprises a quantity of Metal-organic framework or Metal-organic frameworks so that the quantity of the at least Metal-organic framework or Metal-organic frameworks is between about 10 percent and about 50 percent of the weight of the product packaged in the package.

The package may comprise about 1.00 gram (±20%) of Aluminium Fumarate.

The package may comprise about 1.00 gram (±20%) of MIL-101 (Cr).

The package may comprise about 1.00 gram (±20%) of MIL-101 (Fe).

The package may comprise about 0.50 grams of MIL-101 (Cr) and about 0.50 grams (±20%) of Aluminium Fumarate.

The package may be a package for a tobacco or nicotine containing product.

The product for which the moisture content is regulated may be any kind of product for which it is desired to keep the level of moisture content within a predefined range. The product for which the moisture content is regulated may be any kind of product for which the level of moisture content is relevant for the properties of the product.

Advantageously, the product is a product having a desired level of moisture content comprised between about 1 percent and about 15 percent, preferably between about 1.5 percent and 10 percent by weight.

The product can be a "heat-not-burn" product, or a cigarette, or any type of tobacco containing product.

The impregnating bath comprises a moisture regulating composition comprising 20-60 weight percent on total dry weight basis of at least one Metal-organic framework compound and 80-40 weight percent on total dry weight basis of at least one binder material and a solvent. The impregnating bath may further comprise water as dissolving substance.

By immersing the support material in the impregnating bath the support material is impregnated with the solution of the impregnating bath. Thanks to the composition of the impregnating bath, after drying it is possible to obtain a support material having between about 30 grams per square meter and about 300 grams per square meter of the at least one Metal-organic framework.

The support material may be immersed in the solution of the impregnating bath until the support material is saturated with the impregnating bath.

After immersing the support material into the solution of the impregnating bath the method can provide for feeding the support material impregnated with the solution of the impregnating bath to metering rolls to remove excess solution from the support material and then drying the support material.

In the drying step the support material may be dried to obtain a support material comprising the at least one Metal-organic framework exhibiting a moisture content which would be in equilibrium at the temperature of 23 Celsius and the pressure of 1 atmosphere with a mixture air-water characterized by a relative humidity comprised between about 0 and 20 percent, according to the corresponding sorption isotherm of the at least one Metal-organic framework.

In the drying step the support material may be dried to obtain a support material comprising the at least one Metal-organic framework exhibiting a moisture content which would be in equilibrium at the temperature of 23 Celsius and the pressure of 1 atmosphere with a mixture air-water characterized by a relative humidity comprised between about 0 and 10 percent, according to the corresponding sorption isotherm of the at least one Metal-organic framework.

In the drying step the support material may be dried to obtain a support material comprising the at least one Metal-organic framework exhibiting a moisture content which would be in equilibrium at the temperature of 23 Celsius and the pressure of 1 atmosphere with a mixture air-water characterized by a relative humidity comprised between about 0 and 5 percent, according to the corresponding sorption isotherm of the at least one Metal-organic framework.

The support material is dried so as to obtain a support material having a moisture content which would be in equilibrium at the temperature of 23 Celsius and the pressure of 1 atmosphere with a mixture air-water having a relative humidity lower than the minimum threshold value of relative humidity of the sorption isotherm of the at least one Metal-organic framework.

In the drying step the support material is dried to evaporate the solvent from the support material so as to obtain a support material comprising the at least one Metal-organic framework exhibiting a moisture content comprised between about 0 weight percent and 20 weight percent based on the weight of the at least one Metal-organic framework without water.

In the drying step the support material is dried to evaporate the solvent from the support material so as to obtain a support material comprising the at least one Metal-organic framework exhibiting a moisture content comprised between about 0 weight percent and 10 weight percent based on the weight of the at least one Metal-organic framework without water.

In the drying step the support material is dried to evaporate the solvent from the support material so as to obtain a support material comprising the at least one Metal-organic framework exhibiting a moisture content comprised between about 0 weight percent and 5 weight percent based on the weight of the at least one Metal-organic framework without water.

The support material can be a web of material that it is continuously supplied to the impregnating bath.

The support material can be a sheet of material that it is supplied to the impregnating bath.

The preparation of the support material containing the moisture regulating composition may be performed also with other methods known in the art.

The support material comprising the moisture regulating composition may be obtained by any available technology known in the art.

Adsorption indicates the adhesion of atoms, ions or molecules from a gas, liquid or dissolved solid to a surface. This process creates a film of the adsorbate on the surface of the adsorbent. Absorption denotes the process in which a fluid (the absorbate) is dissolved by or permeates a liquid or solid (the absorbent), respectively. The term sorption encompasses both processes.

In this specification the term adsorption is used for indicating both the "adsorption" and "absorption" process. Analogously the term "adsorbing" is used here for indicating both the "adsorbing" and "absorbing" process.

In the present specification the definition "adsorption isotherm" denotes the "moisture sorption isotherm", i.e. the relationship between water content of a material at equilibrium and equilibrium relative humidity. For each relative humidity value, the adsorption isotherm indicates the corresponding water content value at a given, constant temperature.

Relative humidity is the ratio of the partial pressure of water vapour to the equilibrium vapour pressure of water at a given temperature and it is usually expressed in percent. Relative humidity depends on temperature and the pressure of the system. Here the relative humidity is measured at a temperature of about 23 Celsius and at the atmospheric pressure, i.e. 1 atmosphere. The relative Humidity (RH) of an air-water mixture is defined as the ratio of the partial pressure of water vapour ($p_{H2O}$) in the mixture to the equilibrium vapour pressure of water ($p^*_{H2O}$) over a flat surface of pure water at a given Temperature: $RH=p_{H2O}/p^*_{H2O}$.

In the present specification it is indicated as "water content" or "moisture content" the quantity of water contained in a material. The moisture content is expressed as a ratio, which can range from 0 (completely dry) to the value of the materials' porosity at saturation. It can be given on a volumetric or mass (gravimetric) basis. In the present application it is indicated on a mass basis, i.e. the moisture content is the ratio between the mass of the water contained inside the material and the mass of the material itself without water.

Metal-organic frameworks (MOFs) are a class of compounds consisting of metal ions or clusters coordinated to organic ligands to form one-, two-, or three-dimensional structures containing potential voids. Metal-organic frameworks (MOFs) are provided with pores having a dimension less than 2 nanometers and have a crystalline nature and are very stable. The Metal-organic frameworks are light and porous materials with outstanding surface area.

With the definition "Metal-organic framework without water" it is indicated the Metal-organic framework at dry condition, void of water.

"Binder" here denotes any compound which can be bound to the Metal-organic framework or Metal-organic frameworks and to a possible support material.

As used herein, the term "modifier" denotes any additive that can be added to the moisture regulating composition or solution for improving the properties, for example the solubility of the at least one Metal-organic framework, the solubility of the binder, the chemical connection between Metal-organic framework and the binder, the adhesion to the support material, etc.

As used herein, the term "support material" denotes any material that can be used as a support for a product or for preparing a package.

"Fiber-based support material" denotes a material including fibres. The fiber-based support material may include any type of fibres, for example cellulose fibres.

As used here the definition "impregnating bath" denotes a bath containing a solution with a solvent and a compound dissolved in the impregnating bath and in which a support material may be immersed. The support material is impregnated with the solution of the impregnating bath and adsorbs the solution contained in the impregnating bath.

As used herein, the terms "sheet" denotes a laminar element having a width and length substantially greater than the thickness thereof.

As indicated herein the definition "web" denotes, a laminar element having a width and length substantially greater than the thickness thereof and the length substantially greater than the width, usually wrapped in reels.

Specific embodiments will be further described, by way of example only, with reference to the accompanying drawings in which.

Figure 1:
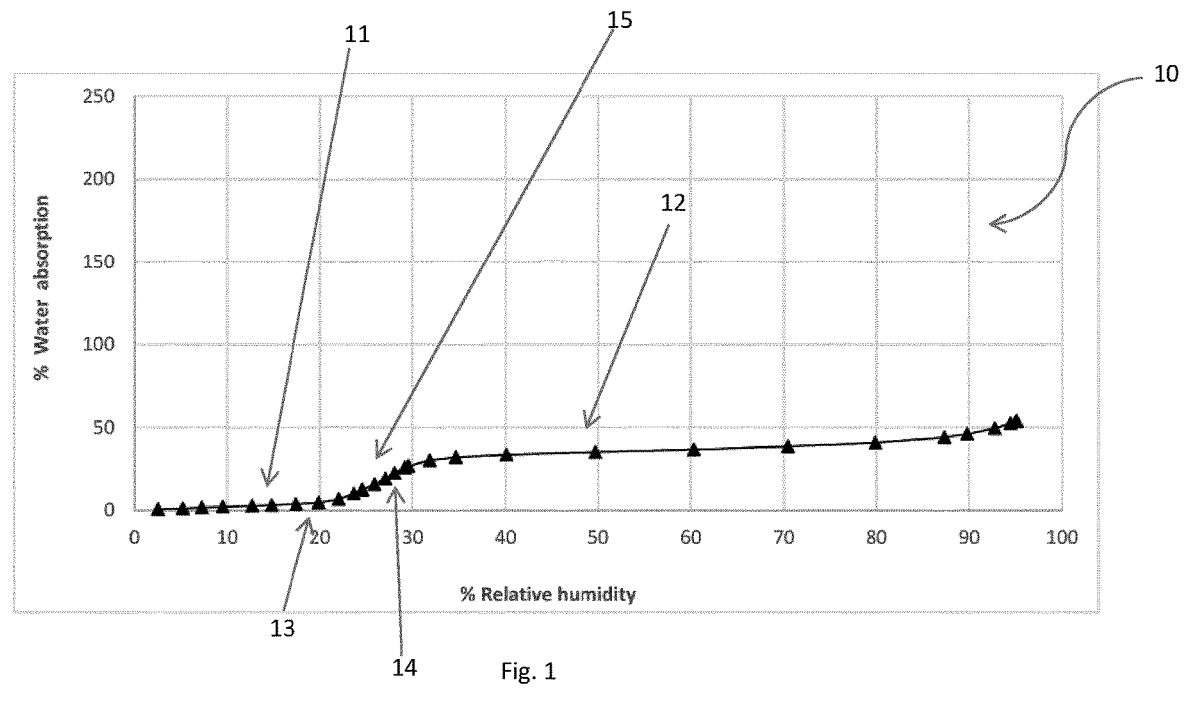
FIG. 1 shows a sorption isotherm of a sample of Aluminium Fumarate at 23 Celsius and at a pressure of 1 atmosphere.
Figure 2:
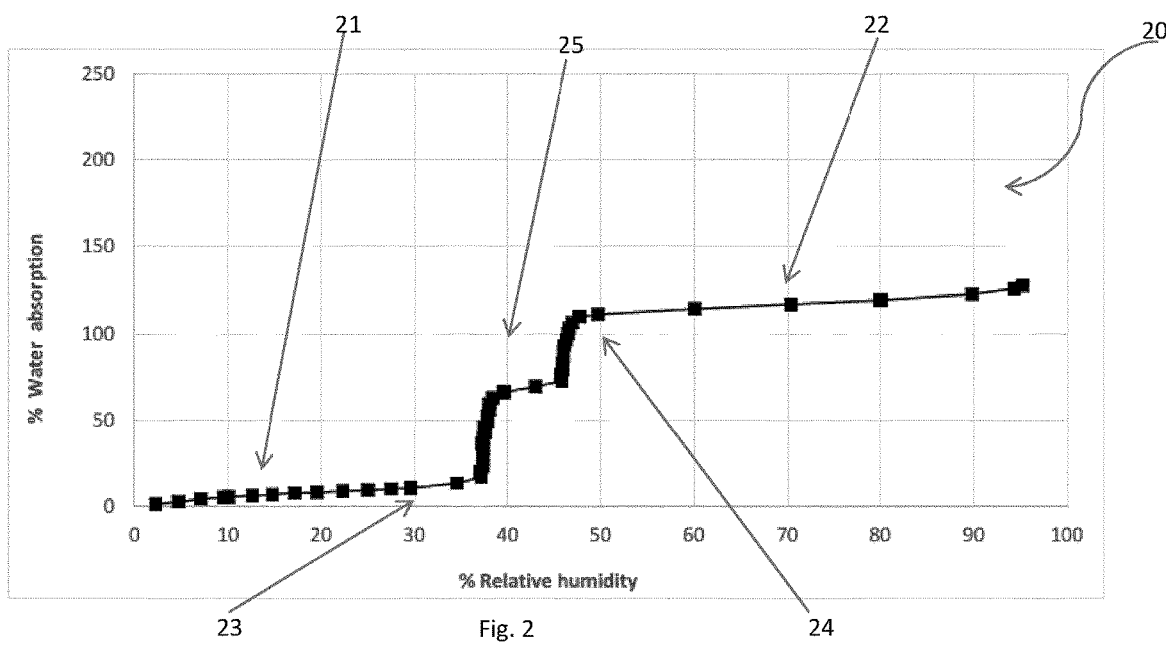
FIG. 2 shows a sorption isotherm of a sample of MIL-101 at 23 Celsius and at a pressure of 1 atmosphere.

In FIGS. 1 and 2 the sorption isotherm of the Aluminium Fumarate and of the MIL-101 (Cr) respectively are reported.

Many compounds adsorb water at defined humidity, temperature and pressure conditions.

For each material or compound at a set temperature value, in equilibrium condition, the relationship between water content of the compound or material and equilibrium relative humidity can be displayed graphically by a curve, the so-called moisture sorption isotherm.

The moisture sorption isotherm indicates for each relative humidity value the corresponding water content value at a given, constant temperature.

Changing the temperature also the path of the adsorption isotherm changes, as the equilibrium conditions change in relation to the temperature. Usually, increasing the temperature the materials hold less water and, on the contrary, decreasing the temperature the material can hold more water.

If the material or compound changes, then the adsorption behaviour also changes.

Adsorption isotherm provides the measure of water uptake of a material with respect to change in the relative humidity.

With reference to FIG. 1, the adsorption isotherm of the Aluminium Fumarate is reported obtained at 23 Celsius and at a pressure of 1 atmosphere using a sample of 70 milligrams of pure Aluminium Fumarate.

The adsorption isotherm analysis at 23 Celsius and 1 atmosphere of pure Aluminium Fumarate was carried out in a Belsorp aqua 3 machine, MicrotracBEL Corp. Japan.

Before analysis the Aluminium Fumarate was activated by placing the sample in a container of a Belprep II machine with vacuum, at a pressure of 0.01 kiloPascal, (MicrotracBEL Corp. Japan) and purging few times with Argon.

Then the sample has been heated up to 200 Celsius in two hours and held at this temperature for 8 hours in order to reduce the water content of the sample to about 1 weight percent.

After cooling down, the container is filled with Argon and placed in the Belsorp aqua 3 machine.

The relative humidity of the container is then changed over time and the water intake of the sample of Aluminium Fumarate is registered so as to obtain the sorption isotherm of FIG. 1. The measurement was done at laboratory temperature of 23 Celsius at a pressure of 1 atmosphere.

The same procedure has been repeated for the sample of pure MIL-101 (Cr) obtaining the adsorption isotherm of FIG. 2.

With reference to FIG. 2 the adsorption isotherm of the MIL-101 (Cr) is reported obtained at 23 Celsius and the pressure of 1 atmosphere using a sample of 70 milligrams of pure MIL-101 (Cr).

The Aluminium Fumarate and the MIL-101(Cr) were purchased from NovoMOF, AG, Switzerland.

FIG. 1 reports in the abscissa (x-axis) the percent relative humidity, in the ordinate (y-axis) the percent of water adsorption. The water adsorption is indicated as weight percent i.e. the weight of the water adsorbed/the weight of the Aluminium Fumarate or MIL-101 (Cr).

The adsorption isotherm of Aluminium Fumarate has a sigmoidal path.

With specific reference to FIG. 1, the adsorption isotherm 10 of Aluminium Fumarate comprises a first portion 11 comprised between zero relative humidity and a minimum threshold value of relative humidity 13 in which the Aluminium Fumarate adsorbs about 1-5 percent of water and the water adsorbed by the Aluminium Fumarate has a gradual increase in dependence of the relative humidity.

The sorption isotherm 10 of the Aluminium Fumarate comprises a second portion 12 comprised between the maximum threshold value of relative humidity 14 and one hundred percent of relative humidity in which the Aluminium Fumarate adsorbs low quantities of water in relation to the increase in relative humidity. In the second portion the Aluminium Fumarate adsorbs from about 35 to about 54 percent of water. The water adsorbed has a gradual increase in dependence of the relative humidity.

The minimum threshold value of relative humidity 13 is about 20 percent; the maximum threshold value of relative humidity 14 is about 34 percent.

The sorption isotherm 10 comprises an adsorption portion 15 comprised between the minimum threshold value of relative humidity 13 and the maximum threshold value of relative humidity 14. In the adsorption portion 15 the Aluminium Fumarate adsorbs higher quantities of water in relation to quantity of water adsorbed in the first portion 11 or the second portion 12. In the adsorption portion 15 the water adsorbed has a high increase in dependence on the relative humidity.

Considering the slope of the sorption isotherm 10, the slope in the first portion and in the second portion is lower than the slope in the adsorption portion. In the adsorption portion 15 the increase in the water adsorbed following an increase of the relative humidity is considerably higher that the increase in the water adsorbed following an increase of the relative humidity in the first portion 11 or in the second portion 12.

In the adsorption portion 15 the Aluminium Fumarate adsorbs from about 5 to about 35 percent of water.

FIG. 2 reports the sorption isotherm for MIL-101 (Cr), reporting in the abscissa (x-axis) the percent relative humidity, in the ordinate (y-axis) the percent of water adsorption. The water adsorption is indicated as weight percent i.e. the weight of the water adsorbed/the weight of the Aluminium Fumarate or MIL-101 (Cr). The sorption isotherm of MIL-101 (Cr) has also a sigmoidal path.

Features corresponding to the features of FIG. 1 will be indicated with a different corresponding reference number for clarity sake.

The sorption isotherm 20 of MIL-101 (Cr) comprises a first portion 21 comprised between zero relative humidity and a minimum threshold value of relative humidity 23 in which the MIL-101 (Cr) adsorbs about 1-5 percent of water and the water adsorbed by the MIL-101 (Cr) has a gradual increase in dependence of the relative humidity.

The sorption isotherm 20 of the MIL-101 (Cr) comprises a second portion 22 comprised between the maximum threshold relative humidity 24 and one hundred percent of relative humidity in which the MIL-101 (Cr) adsorbs from about 110 to about 127 percent water and the water adsorbed has a gradual increase in dependence of the relative humidity.

The minimum threshold value of relative humidity 23 is about 37 percent; the maximum threshold value of relative humidity 24 is about 48 percent.

The sorption isotherm 20 comprises an adsorption portion 25 comprised between the minimum threshold value of relative humidity 23 and the maximum threshold value of relative humidity 24. In the adsorption portion 25 the MIL-101 (Cr) adsorbs higher quantities of water in relation to quantity of water adsorbed in the first portion 21 or the second portion 22, when the relative humidity is increased. In the adsorption portion 25 the water adsorbed exhibits a high increase in dependence of the relative humidity.

In the adsorption portion 25 the MIL-101 (Cr) adsorbs from about 5 to about 110 percent of water.

Either Aluminium Fumarate and MIL-101 (Cr) show that in the adsorption portion 15, 25 there is an increased adsorption of water for each increase of relative humidity.

The adsorption portion of Aluminium Fumarate and MIL-101 (Cr) is comprised between different minimum threshold and maximum threshold values of relative humidity, such threshold values depending on the specific material.

The water adsorbed by Aluminium Fumarate and MIL-101 (Cr) in the adsorption portion is different as it depends on the specific moisture regulating composition.

Some moisture regulating compositions and moisture regulating solutions according to the invention have been prepared.

The prepared moisture regulating compositions or moisture regulating solutions have been then coupled with a packaging material. At least a portion of the packaging material containing the moisture regulating composition is then inserted in a package for heat not burn products, i.e. tobacco based products, intended for use to be heated, rather than to be burnt. Additionally, some porous pouches containing defined quantity of one or more Metal-organic frameworks have been prepared and inserted in packages for heat not burn products as well.

The relative humidity over time in the packages and the moisture content in the products packed in the packages have been measured.

For the test HEETS packages have been used, provided by Philip Morris International. A HEETS package contains 20 tobacco sticks as Heat-Not-Burn products (HEETS). HEETS, also known as HeatSticks, is a specially designed heated tobacco unit that is intended for exclusive use with the IQOS holder (by Philip Morris International). HEETS are made up of elements that include a tobacco plug, hollow acetate tube, polymer-film filter, cellulose-acetate mouthpiece filter, and outer and mouth-end papers. With the HEETS the tobacco is heated, not burned. Instead of smoke coming from tobacco combustion, an aerosol is released to the user.

A top part of the outer polypropylene film and the inner bundle paper have been removed from the HEETS package to resemble the opening of the HEETS package from a user intending to use the sticks contained in the package. Additionally, 10 sticks out of 20 sticks have been removed from the HEETS package.

For testing the behaviour of some moisture regulating products of the invention, the moisture regulating products have been added to the HEETS packages in some different ways: coated on a sheet of paperboard inserted in the package or impregnated on a sheet of foam paper inserted into the package. Additionally, pure pouches containing Metal-organic framework or Metal-organic frameworks have been prepared and inserted into a package.

Additionally, some reference packages void of any moisture regulating product have been prepared for comparison sake and tested.

In the test, the relative humidity of the prepared packages has been measured, and also the moisture content of the sticks in the packages has been measured.

The HEETS packages may contain tobacco sticks having different features or flavours.

For clarity sake different HEETS packages void of moisture regulating composition have been compared with the corresponding HEETS packages comprising a moisture regulating composition or at least one Metal-organic frameworks. In this way, a clear effect of the moisture regulating composition or of the at least one Metal-organic frameworks on the same type of HEETS package is obtained.

A Plug and track Hygro Button with datalogger (PRO-GESPLUS, France) was also placed inside the HEETS packages for measuring the relative humidity inside the packages. The packages were finally sealed each one in an aluminium bag.

Before placing the Hygro Button relative humidity analyzer in the packages, the buttons were configured with PROGESPLUS software to measure the relative humidity inside the package before and during the duration of the test.

The Hygro Button with built-in datalogger measured the relative humidity every 5 minutes and the graph showing the relative humidity with respect to time is extracted from the PROGESPLUS software.

The water content of the tobacco plug of each stick was determined using Karl Fisher method (similar to ASTM E203-16) with an analyzer Titrando 901 (Metrohm AG, Switzerland) and an analytical balance XP205 (Mettler Toledo, Switzerland). The moisture content of the tobacco plug of each stick is extracted using an oven, by heating the stick at 110 Celsius.

The extracted vapour is transferred to a titration cell with an air flow through a heated transfer line and water content is quantitatively determined by titration. Methanol is used to improve accuracy of the analysis. The endpoint is measured by potentiometry and the result is given in weight percent.

In the experimental test the quantity of Metal-organic framework is indicated in grams with two significant digits after comma, the values of the quantity of the Metal-organic frameworks are rounded to two significant digits.

EXPERIMENTAL TEST

Example 1, 5, 15

HEETS packages containing 20 tobacco sticks for Heat-Not-Burn have been provided.

10 sticks out of 20 sticks have been removed from the HEET package. A Plug and track Hygro Button with datalogger (PROGESPLUS, France) was placed inside the HEETS packages for measuring the relative humidity inside the packages. The packages were finally sealed each one in an aluminium bag. Before placing the Hygro Button relative humidity analyzer in the packages, the buttons were configured with PROGESPLUS software to measure the relative humidity inside the package before and during the duration of the test. The Hygro Button with built-in datalogger measured the relative humidity every 5 minutes and the graph showing the relative humidity as a function of time is extracted from the PROGESPLUS software.

The water content of the tobacco plug of each stick was determined using Karl Fisher method (similar to ASTM E203-16) with an analyzer Titrando 901 (Metrohm AG, Switzerland) and an analytical balance XP205 (Mettler Toledo, Switzerland). The moisture content of the tobacco plug of each stick is extracted using an oven, by heating the stick at 110 Celsius.

Example 2

A moisture regulating solution containing 1.00 grams of starch, 4.70 grams of water, 0.25 grams of Glycerol and 0.50 grams of Aluminium Fumarate has been prepared.

The Aluminium Fumarate was purchased from Novo-MOF, AG, Switzerland.

Glycerol ($HOCH_2CH(OH)CH_2OH$) was purchased from Sigma Aldrich, Switzerland.

Potato starch (($C_6H_{10}O_5)_n$) was purchased from PanReac AppliChem.

0.50 grams of Aluminium Fumarate were sieved and mixed with soluble potato starch. The homogeneously mixed particles were then dissolved in distilled water in which Glycerol had been previously added.

The obtained moisture regulating solution was heated in a water bath up to 85 Celsius and held at this temperature for 45 minutes under magnetic stirring. Afterwards, the solution was cooled down to a temperature of about 20-30 Celsius.

The moisture regulating solution is then coated on a fiber based support material.

The fiber based support material is a low-density foam-formed paper having a density of 400 kilograms per cubic meter and a grammage of 120 gram per square meter, purchased from VTT-Technical Research Centre, Finland.

The fiber based support material was coated with an EZ coater EC 200 from Chemical Instruments Inc. Rod number 8, leading to a 20 micrometers thick layer using a velocity of 0.00635 meters per second.

The first layer was done 30 minutes after the solution was removed from heating source. After the solvent evaporates a second layer coating is applied and then after the solvent is evaporated from the second layer, a third layer coating is applied again. In this way, a layer of about 60 micrometers is obtained. The coating is made on both the surfaces of the support material.

The coated support material is then dried at room temperature and at room relative humidity. Then the coated support material is placed for 3 hours at 80 Celsius in an oven from Froilabo, in order to dry further the support material. The moisture content of the packaging material after the drying step should be below the moisture content corresponding to the minimum threshold value of the relative humidity of the Aluminium Fumarate in the sorption isotherm at the environmental condition (23 Celsius, 1 atmosphere).

Once dried, the fiber based support material was cut in smaller sheet of 4 centimeter×6.5 centimeter.

Then each sheet is sealed in an aluminium bag until further analysis.

For analysing the relative humidity, two sheets have been placed in a HEETS package after removal of the top part of the outer polypropylene film, the inner bundle paper and of 10 sticks from the package.

In this way, a content of about 0.20 grams of Metal-organic framework or Metal-organic frameworks per each package of HEETS is obtained. This is indicated as Example 2 in the following.

A Plug and track Hygro Button with datalogger (PRO-GESPLUS, France) was also placed inside the packages for measuring the relative humidity inside the packages. The packages were finally sealed in an aluminium bag.

Example 3

A moisture regulating solution according to Example 2 has been prepared.

The moisture regulating solution has been then impregnated onto a support.

A paperboard having a density of 240 grams per square meter purchased by Invercote Lenato from Iggesund, Sweden has been used.

The paperboard was cut into 4 centimetre×6.5 centimetre sheets. The sheets were immersed in the moisture regulating solution obtained and kept for 30 minutes, so that the sheets of paperboard are impregnated with the moisture regulating solution.

Sheets were obtained comprising about 0.155 grams of Aluminium Fumarate.

Then the sheets of paperboard have been placed in the oven to dry for 3 hours at 80 Celsius. The moisture content of the packaging material after the drying step should be below the moisture content corresponding to the minimum threshold value of the relative humidity of the Aluminium Fumarate in the sorption isotherm at the environmental condition (23 Celsius, 1 atmosphere). The dried impregnated sheets were stored in aluminium bags until further analysis.

For analysing the relative humidity, two impregnated sheets have been placed in a HEETS package after removal of the top part of the outer polypropylene film, of the inner bundle paper and of 10 sticks from the package, so that in each HEETS package a content of about 0.31 grams of Aluminium Fumarate is obtained. This is indicated as Example 3 in the following.

A Plug and track Hygro Button with datalogger (PRO-GESPLUS, France) was also placed inside the HEETS packages for measuring the relative humidity inside the packages. The packages were finally sealed in an aluminium bag.

Further Examples

For comparison sake some Metal-organic framework solutions void of binder were prepared. The Metal-organic framework solutions were adsorbed or inserted into a porous pouch.

Porous pouches containing 1 gram of Aluminium Fumarate were prepared and positioned in two types of HEETS package. These sample are indicated respectively as Example 4 and 16 in the following.

Porous pouches containing respectively 0.20 grams, 0.50 grams and 1.00 gram of MIL-101 Fe were prepared. These samples are indicated respectively as Example 9-11 in the following.

Porous pouches containing respectively 0.20 grams, 0.50 grams and 1.00 gram of MIL-101 Cr were prepared. These samples are indicated respectively as Example 6-8 in the following. A further pouch with 1 gram of MIL-101 Cr has been prepared and indicated as Example 17 in the following and positioned in another HEETS package.

Metal-organic frameworks porous pouches containing a plurality of Metal-organic frameworks were also prepared.

A porous pouch containing 0.50 grams Aluminium Fumarate and 0.50 grams MIL-101 Fe was also prepared. This sample is indicated as Example 18 in the following.

A porous pouch containing 0.50 grams Aluminium Fumarate and 0.50 grams MIL-101 Cr was also prepared. This sample is indicated as Example 19 in the following.

For analysing the relative humidity, each porous pouch has been placed in a HEETS package after removal of the top part of the outer polypropylene film, the inner bundle paper and of 10 sticks from the package.

A Plug and track Hygro Button with datalogger (PRO-GESPLUS, France) was also placed inside the packages for measuring the relative humidity inside the packages. The packages were finally sealed in an aluminium bag which remained closed for few days. The packages are kept in an aluminium bag until the Relative Humidity inside the package is stabilised. Usually some hours are enough.

In Table 1 reported below the packages analysed are summarised indicating the Example number and the way of adsorption for clarity sake.

The relative humidity has been measured in the different HEETS packages:

HEETS packages containing a moisture regulating composition, Examples 2 and 3;

HEETS packages containing one or more Metal-organic frameworks, Examples 4, 6-11 and 16-19;

in HEETS packages void of Metal-organic framework, Example 1, 5 and 15.

TABLE 1

| SAMPLE | PREPARATION | INTEGRATION METHOD |
|---|---|---|
| Example 1 | Reference 1 | n/a |
| Example 2 | Aluminium Fumarate 0.20 g | Coating |
| Example 3 | Aluminium Fumarate 0.31 g | Impregnation |
| Example 4 | Aluminium Fumarate 1.00 g | Porous pouch |
| Example 5 | Reference 2 | n/a |
| Example 6 | MIL-101 (Cr) 0.20 g | Coating |
| Example 7 | MIL-101 (Cr) 0.50 g | Impregnation |
| Example 8 | MIL-101 (Cr) 1.00 g | Porous pouch |
| Example 9 | MIL-101 (Fe) 0.20 g | Coating |
| Example 10 | MIL-101 (Fe) 0.50 g | Impregnation |
| Example 11 | MIL-101 (Fe) 1.00 g | Porous pouch |
| Example 15 | Reference 4 | n/a |
| Example 16 | Aluminium Fumarate 1.00 g | Porous pouch |
| Example 17 | MIL-101 (Cr) 1.00 g | Porous pouch |
| Example 18 | Aluminium Fumarate 0.50 + MIL-101 (Fe) 0.50 g | Porous pouch |
| Example 19 | Aluminium Fumarate 0.50 + MIL-101 (Cr) 0.50 g | Porous pouch |

Measurements

At a certain time, indicated as time T0, all packages prepared according to the Examples 1-19 discussed above and reported in Table 1 were opened and the aluminium bags were placed in a climatic chamber at 30 Celsius with a relative humidity of 75 percent.

Three sticks were removed from each package and the three sticks of each Example of Table 1 were sealed together in a further aluminium bag.

After 2, 4, 6, 8, 24 and 48 hours, one stick was removed from each package and sealed in aluminium bag with the other sticks of the same Example and thus from the same package until the sticks in each package are finished.

All the sticks were then analyzed by Karl Fischer method to measure the water content of the different sticks removed from the packages as explained below. During the entire experiment, the evolution of relative humidity in each package was recorded as explained below.

Relative Humidity Analysis

As indicated above, for measuring the relative humidity inside the packages a Plug and track Hygro Button with datalogger (PROGESPLUS, France) was placed inside the packages. Before placing the Hygro Button relative humidity analyzer in the packages, the buttons were configured with PROGESPLUS software to measure the relative humidity inside the package before and during the duration of the test. The Hygro button that has built-in datalogger measured the relative humidity every 5 minutes and the graph showing the relative humidity with respect to time is extracted from the PROGESPLUS software.

The results obtained for the packages of the Examples 15-19 are reported in FIG. 3 and discussed below.

Water Content Analysis

The water content of the tobacco plug of each stick was determined using Karl Fisher method (similar to ASTM E203-16) with an analyzer Titrando 901 (Metrohm AG, Switzerland) and an analytical balance XP205 (Mettler Toledo, Switzerland). The water contained in the tobacco plug of each stick is extracted using an oven, by heating the stick at 110 Celsius.

The extracted vapour is transferred to a titration cell with an air flow through a heated transfer line and water content is quantitatively determined by titration.

Methanol is used to improve accuracy of the analysis.

The endpoint is measured by potentiometry and the result is given in weight percent.

The percent water content of the each of the stick at each time interval is analysed to determine the adsorption capacity of the adsorbing material or materials used in the Examples.

The results obtained from the sticks of the Examples 15-19 are reported in FIG. 4 and discussed below.

Results

Figure 3:
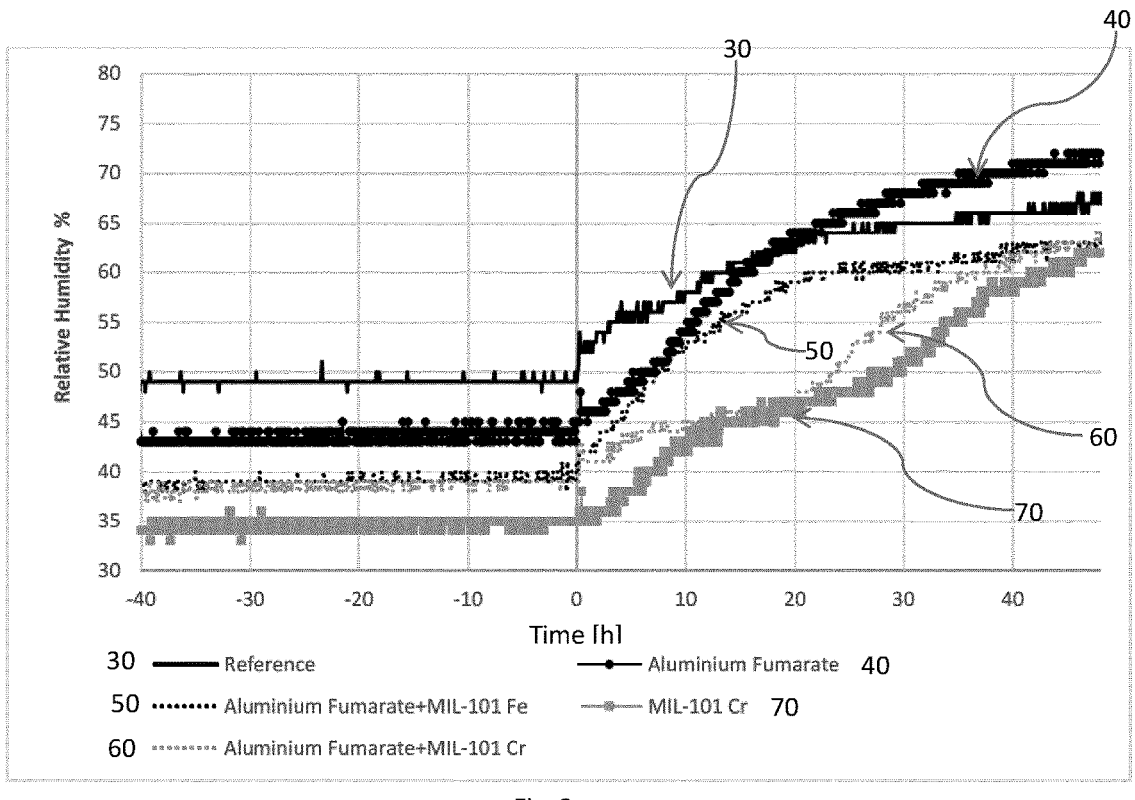
FIG. 3 shows the percent relative humidity over time of some of the packages prepared in the Examples.

The change of relative humidity inside the HEETS packages with and without use of Metal organic framework from the moment they are sealed to the moment they are opened and kept for two days at 30 Celsius and 75 percent relative humidity are illustrated in FIG. 3.

FIG. 3 reports in the abscissa (x-axis) the time in hours [h], in the ordinate (y-axis) the percent of percent relative humidity.

Curve 30 shows the change of percent relative humidity over time inside HEETS package without moisture regulating composition, Example 15. Curve 40 shows the change of percent relative humidity over time inside HEETS package with the moisture regulating composition of Example 16, Aluminium Fumarate pure. Curve 50 shows the change of percent relative humidity over time inside HEETS package with the moisture regulating composition of Example 18, Aluminium Fumarate 0.50 grams and MIL 101 Fe 0.50 grams. Curve 60 shows the change of percent relative humidity over time inside HEETS package with the moisture regulating composition of Example 19, Aluminium Fumarate 0.50 grams and MIL 101 Cr 0.50 grams. Curve 70 shows the change of percent relative humidity over time inside HEETS package with the moisture regulating composition of Example 17, MIL 101 Cr 1.00 grams.

As it is clear form Curve 30 the level or relative humidity in a package void of Metal-organic framework is higher than in the packages provided with an adsorbing material.

At the first opening of the package void of Metal-organic framework a sudden increase in the relative humidity percent is visible.

The packages provided with at least a Metal-organic framework have lower level of relative humidity in comparison with the packages void of Metal-organic framework. The packages of Examples 17, 18 and 19 maintain a level of humidity lower than the packages void of Metal-organic framework even after 48 hours from the first opening.

As clear from curve 30, in the package of Example 15 the relative humidity inside the package during storage is about 50 percent. Once the package is opened, the relative humidity dramatically increases up to 75 percent after about 24 hours, which is the environmental relative humidity in the test. As it is clear from curve 30, the increase of relative humidity inside the package is not linear and relative humidity doesn't reach 75 percent instantaneously inside the packages, as the paperboard and part of the wrapping film left on the package act as a barrier and since part of the water vapour entering is adsorbed by the sticks.

As it is clear from FIG. 3 the change of relative humidity inside the packages has a sigmoidal path after the opening of the packages.

Analysing the curves 40, 50, 60 and 70 the influence of the Metal-organic framework on the level of relative humidity on both closed and open packages is clearly visible. Compared to the reference, the relative humidity of packages with Metal-organic framework is lower and the more Metal-organic framework is in the packages, the lower is relative humidity in the packages.

For example, the relative humidity obtained by the example 18 is intermediate between the relative humidity obtained with Example 17 and 16.

Therefore, by choosing and mixing different Metal-organic frameworks the relative humidity in the package may be adjusted.

In particular, it is possible to adjust the minimum threshold value of relative humidity and the maximum threshold value of relative humidity, and thus the adsorption portion of the sorption isotherm. It is then possible to adjust the water adsorbed in the adsorption portion of the sorption isotherm.

Similarly, the water content of the of tobacco plug of the stick samples removed during the test at various time intervals was determined through Karl Fischer analysis. The results are visible in FIG. 4. FIG. 4 reports in the abscissa (x-axis) the time in hours [h], in the ordinate (y-axis) the percent of water content of the sticks.

The water content of the tobacco plug in the different examples reflects the relative humidity of the packages of the corresponding Examples.

Figure 4:
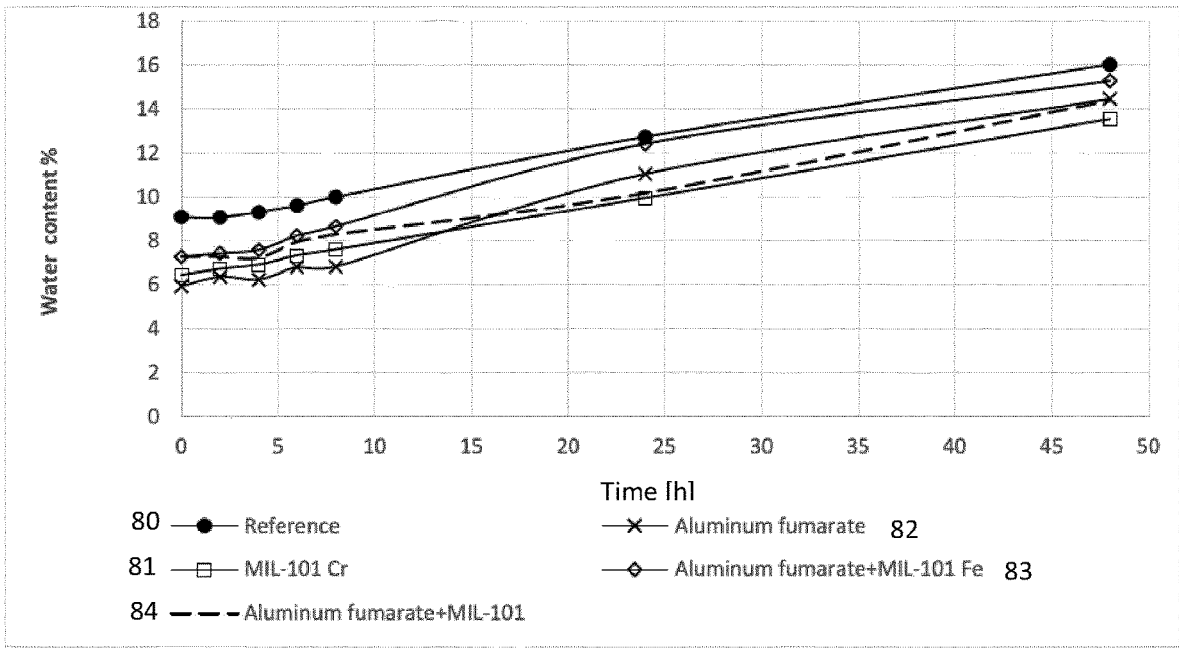
FIG. 4 shows the percent of the moisture content over time of the sample sticks of the packages of the Examples of FIG. 3.

In FIG. 4 with 80 it is indicated the curve representing the water content of tobacco plug over time in the package of Example 15 void of Metal-organic framework, 81 is the curve representing the water content of tobacco plug over time in the package of Example 16 with 1 g of Aluminium Fumarate, 82 is the curve representing the water content of tobacco plug over time in the package of Example 17, 83 is the curve representing the water content of tobacco plug over time in the package of Example 18, 84 is the curve representing the water content of tobacco plug over time in the package of Example 19.

Table 2 reported below summarizes all the results obtained for all tested Examples.

In Table 2 for each Example it is indicated in the first column the amount of Metal-organic framework or Metal-organic frameworks, the percent relative humidity in the package before opening in the second column, the percent of water initial content of the sticks before opening in the third column. In the fourth column it is reported the time necessary for the stick to reach 11 percent of water content once the package has been opened under the experimental conditions. In the fifth column of Table 2 it is reported the percent relative humidity in the package after 48 hours at the experimental condition: 30 Celsius, pressure of 1 atmosphere, and 75 percent relative humidity. In the sixth column of Table 2 it is reported the percent water content in the stick after 48 hours at the experimental condition, i.e. 30 Celsius, pressure of 1 atmosphere, and 75 percent relative humidity.

The results are summarised in the Table 2 reported below.

For products having different level of moisture content different moisture regulating composition may be used.

Therefore, depending on the different package or product for which the moisture content should be regulated, it is possible to choose a particular moisture regulating compo-

TABLE 2

| Sample | Metal-organic framework (grams) | Relative humidity in the package before opening (Percent) | Initial water content (weight Percent) | Time to reach 11 weight percent water content (hour) | Relative humidity in package after 48 hours at 30 Celsius, 75 percent RH (percent) | Water content after 48 hours at 30 Celsius, 75 percent RH (weight percent) |
|---|---|---|---|---|---|---|
| Example 1 | 0.00 | 48.7 | 9.7 | 6 | 72 | 17.3 |
| Example 2 | 0.20 | 45 | 8.6 | 10 | 70 | 17.2 |
| Example 3 | 0.30 | 41.9 | 7.8 | 11.5 | 69 | 16.5 |
| Example 4 | 0.90 | 28.9 | 5.8 | 17.5 | 69 | 15.7 |
| Example 5 | 0.00 | 50 | 10.0 | 3.2 | 72 | 19.6 |
| Example 6 | 0.20 | 45 | 9.7 | 4.6 | 72 | 19.4 |
| Example 7 | 0.50 | 43 | 9.7 | 5.2 | 72 | 19.2 |
| Example 8 | 1.00 | 42 | 9.3 | 5.8 | 71 | 19.1 |
| Example 9 | 0.20 | 49.1 | 9.9 | 3 | 72 | 19.6 |
| Example 10 | 0.50 | 49 | 10.0 | 3 | 72 | 19.0 |
| Example 11 | 1.00 | 47 | 9.7 | 3.4 | 71 | 19.1 |
| Example 15 | 0.00 | 49 | 9.1 | 13 | 70 | 16.0 |
| Example 16 | 1.00 | 44 | 5.9 | 24 | 67 | 14.4 |
| Example 17 | 1.00 | 35 | 6.4 | 32 | 62 | 13.5 |
| Example 18 | 1.00 | 39 | 7.3 | 16 | 63 | 15.3 |
| Example 19 | 1.00 | 39 | 7.3 | 27 | 63 | 14.4 |

Results

The prepared moisture regulating compositions exhibit a sigmoidal shape of the adsorption isotherm.

The adsorption isotherms of the prepared moisture regulating compositions exhibit a sudden and sharp increase in adsorbed water following the increase of the relative humidity, i.e. opening of the packages at experimental condition.

By choosing the Metal-organic framework or a combination of a plurality of Metal-organic frameworks the adsorption behaviour of the moisture regulating composition may be tailored to a desired need and level of relative humidity. By choosing the used Metal-organic framework or the Metal-organic frameworks the level of relative humidity is adjusted, at which the moisture regulating composition absorbs water and, therefore, the relative humidity in the package or the water content of the product packaged in the package containing the moisture regulating composition.

Therefore, depending on the different applications, it is possible to use a particular moisture regulating composition which is suitable to keep the desired level of relative humidity in a package.

Knowing the desired level moisture content of a product, it is possible to choose the moisture regulating composition allowing the desired level of moisture content to be maintained. It is also possible to choose the support material and/or the quantity of support material to be used for maintaining the desired level of moisture content.

It has been also demonstrated that the presence of the binder or binders improves the application of the Metal-organic framework or Metal-organic frameworks onto the support.

Tests have also demonstrated that even small quantities of Metal-organic framework or Metal-organic frameworks effectively maintain the relative humidity in a desired range.

When HEETS sticks are produced and packaged, the relative humidity in the packages is around 8-10 percent. The moisture adjusting composition of the invention or at least one Metal-organic framework has been so adjusted that the moisture content of the tobacco plugs is kept around the desired level.

sition which is suitable to keep the desired level of relative humidity in the package and desired level of moisture content in the product.

Therefore, depending on the different product, it is possible to use a particular moisture regulating composition which is suitable to keep the desired level of moisture content in the product.

Knowing the desired level of moisture content of a product, it is possible to choose the moisture regulating composition allowing the desired level of moisture content to be maintained.

Tests have also demonstrated that with the moisture regulating composition of the invention a too high desiccation of the product and also a too high moistening of the product are prevented.

As it is clear from Table 2, before opening, in the packages containing the moisture adjusting composition of the invention or at least one Metal-organic framework the moisture content of the tobacco plugs is lower than the moisture content of the tobacco plugs in the corresponding package without moisture adjusting composition of the invention or at least one Metal-organic framework.

This is also confirmed after 48 hours from the opening: in the packages containing the moisture adjusting composition of the invention or at least one Metal-organic framework the moisture content of the tobacco plugs is lower than the moisture content of the tobacco plugs in the corresponding package without moisture adjusting composition of the invention or at least one Metal-organic framework.

With the moisture regulating composition of the invention or at least one Metal-organic framework the moisture content of the tobacco plug is also adjusted to avoid a too high reduction of the moisture content.

Tests also demonstrate that the effect of adsorbing water may be obtained either by impregnating the moisture regulating composition on a packaging material or by coating the moisture regulating composition on a support material, or also applying the moisture regulating composition on a porous pouch.

Tests have also demonstrated that an existing conventional HEETS package may be improved by adding a support material provided with a moisture regulating composition.

Therefore, conventional packages of many different products may be improved in a similar way.

Tests also demonstrated that by choosing the moisture regulating composition it is possible to adjust the moisture content of the tobacco or nicotine containing product to a desired level which could be also different for the different tobacco or nicotine containing products.

The moisture regulating composition acts to create an active layer that can be tuned to absorb a certain amount of water and above a certain minimum threshold value of relative humidity.

Hence, by selecting the right moisture regulating composition and selecting the desired mix of Metal-organic framework or Metal-organic frameworks it is possible to obtain an adsorption isotherm having a desired S-shape. It is possible to obtain the adsorption isotherm that fits the desired moisture content of the tobacco or nicotine containing product.

Additionally, by selecting the right moisture regulating product and selecting the desired mix of Metal-organic framework or Metal-organic frameworks, it is possible to obtain a moisture regulating product and thus a packaging material that does not alter the water content of the tobacco or nicotine containing product in an undesirable way.

It is also possible to obtain a moisture regulating product adsorbing water at a relative humidity higher than a minimum threshold value. It is further possible to avoid a too high desiccation of the tobacco or nicotine containing product during shelf life, i.e. before first opening.

The invention claimed is:

1. A package comprising a packaging element made of a support material comprising a coating layer containing a moisture regulating composition, the moisture regulating composition comprising: 20-60 weight percent on total dry weight basis of at least one Metal-organic framework compound and 80-40 weight percent on total dry weight basis of at least one binder material, wherein the at least one Metal-organic framework compound is chosen in a group comprising:

Aluminium Fumarate ($C_{12}H_6Al_2O_{12}$), chromium terephthalate Metal-organic frameworks MIL-101 (Cr), comprising trimeric chromium (III) octahedral clusters interconnected by 1,4-benzenedicarboxylates and having empirical formula $[Cr_3(O)X(bdc)_3(H_2O)_2]$, wherein bdc is benzene-1,4-dicarboxylate and X is OH or F, functionalized chromium terephthalate Metal-organic frameworks MIL-101(Cr)-X, where X denotes an electron withdrawing group selected from $NO_2$, $SO_3H$ and Cl, or an electron donor group selected from $NH_2$ and $CH_3$, iron terephthalate Metal-organic frameworks MIL-101 (Fe), chromium-based Metal-organic frameworks with underlying soc topology Cr-soc-Metal-organic framework-1 with chemical formula $[Cr_3(\mu3-O)(H_2O)2(TCPT)1.5Cl]$ where TCPT is tetratopic 3,3",5,5"-tetrakis(4-carboxyphenyl)-p-terphenyl ligand, isostructural Zr(IV)-MOFs with rare low-symmetric 9-connected Zr6 MOFs, indicated as Zr(IV)-MOFs BUT-46F, BUT-46A, BUT-46W, and BUT-46B, hybrid microporous highly connected rare-earth-based Metal-organic frameworks Y-shp-MOF-5, where "shp" denotes square hexagonal prism, or any combination thereof, wherein the at least one binder is chosen in a group comprising: starch $((C_6H_{10}O_5)n-(H_2O))$, alginic acids $((C_6H_8O_6)n)$, alginates, copolymers of polyacrylic acid $((C_3H_4O_2)n)$, and/or copolymers of maleic acid $(HO_2CCH=CHCO_2H)$, polyaspartic acid $((C_4H_5NO_3)n)$, polyvinylalcohol-co-ethylene (EVOH, $C_4H_{8O}$), polyvinylalcohol-co-vinyl acetate, polyethylene oxide $((—CH_2CH_2O—)n)$, or any combination thereof;

wherein the coating layer containing the moisture regulating composition has a thickness comprised between 10 micrometres and 80 micrometres.

2. A package according to claim 1, wherein the support material is a fiber-based material or plastic support material.

3. A package according to claim 2, wherein the support material is selected from the group consisting of paper, paperboard, textiles, fabrics, non-wovens, polymers, polymer foams, and polymer films.

4. A package according to claim 2, where the support material comprises between 20 grams and 300 grams of the moisture regulating composition per square meter of the support material, and wherein the relative weight ratio between the at least one Metal-organic framework and the at least one binder is between 1:4 and 3:2.

5. A package according to claim 2 wherein the moisture regulating composition is impregnated in the support material.

6. A package according to claim 2, wherein the support material comprises a support layer made of fiber-based material or plastics material and the coating layer containing the moisture regulating composition is applied on the support layer, so that an amount of the moisture regulating composition in the support material is comprised between 20 grams per square meter and 300 grams per square meter.

7. A package according to claim 2, wherein the support material is a foamed support material having a density between 10000 grams per cubic meter and 90000 grams per cubic meter.

8. A package according to claim 2 comprising an amount of at least one Metal-organic framework comprised between 0.30 grams and 5.00 grams.

9. Method for preparing a package according to claim 2, wherein the method comprises the following steps:

a) preparing the packaging element, wherein preparing the packaging element comprises the following steps:

a-i) providing the support material;

a-ii) providing an impregnating bath of a moisture regulating solution containing the moisture regulating composition and a solvent;

a-iii) immersing the support material into the impregnating bath until the support material is impregnated with the solution of the impregnating bath; and a-iv) drying the support material to evaporate the solvent from the support material so as to obtain a support material comprising the at least one Metal-organic framework exhibiting a moisture content which would be in equilibrium at the temperature of 23 Celsius and the pressure of 1 atmosphere with a mixture air-water characterized by a relative humidity comprised between about 0 and 25 percent, according to the corresponding sorption isotherm of the at least one Metal-organic framework; and b) inserting at least a portion of the packaging element into the package.

10. Method for preparing a package according to claim 2, wherein the method comprises the following steps:

a1) preparing the packaging element, wherein preparing the packaging element comprises the following steps:

a1-i) providing the support material;

a1-ii) providing an impregnating bath of a moisture regulating solution containing the moisture regulating composition and a solvent;

a1-iii) immersing the support material into the impregnating bath until the support material is impregnated with the solution of the impregnating bath and a1-iv) drying the support material to evaporate the solvent from the support material so as to obtain a support material comprising the at least one Metal-organic framework exhibiting a moisture content comprised between about 0 weight percent and 25 weight percent based on the weight of the at least one Metal-organic framework without water; and b) inserting at least a portion of the packaging element into the package.

11. Method according to claim 10, further comprising after step a1-iii) and before step a1-iv) the following step:

feeding the support material impregnated with the solution of the impregnating bath to metering rolls to remove excess solution from the support.

12. Method according to claim 9, wherein the support material is a web of support material that is continuously supplied to the impregnating bath.

13. A package comprising a packaging element made of a support material comprising a coating layer containing a moisture regulating composition, the moisture regulating composition comprising: 20-60 weight percent on total dry weight basis of at least one Metal-organic framework compound and 80-40 weight percent on total dry weight basis of at least one binder material, wherein the at least one Metal-organic framework compound is chosen in a group comprising:

Aluminium Fumarate ($C_{12}H_6Al_2O_{12}$), functionalized chromium terephthalate Metal-organic frameworks MIL-101(Cr)-X, where X denotes an electron withdrawing group selected from $NO_2$, $SO_3H$ and Cl, or an electron donor group selected from $NH_2$ and $CH_3$, chromium-based Metal-organic frameworks with underlying soc topology Cr-soc-Metal-organic framework-1 with chemical formula [$Cr_3(\mu3-O)(H_2O)2(TCPT)$ 1.5Cl] where TCPT is tetratopic 3,3",5,5"-tetrakis(4-carboxyphenyl)-p-terphenyl ligand, isostructural Zr(IV)-MOFs with rare low-symmetric 9-connected Zr6 MOFs, indicated as Zr(IV)-MOFs BUT-46F, BUT-46A, BUT-46W, and BUT-46B, hybrid microporous highly connected rare-earth-based Metal-organic frameworks Y-shp-MOF-5, where "shp" denotes square hexagonal prism, or any combination thereof, and wherein the at least one binder is chosen in a group comprising: wherein the at least one binder is chosen in a group comprising: carboxymethyl cellulose (CMC, $C_6H_7O_2(OH)2CH_2COONa$), hydroxyethylcellulose ($C_{29}H_{52}O_{21}$), hydroxypropylcellulose ($C_{36}H_{70}O_{19}$), or any combination thereof;

wherein the coating layer containing the moisture regulating composition has a thickness comprised between 10 micrometres and 80 micrometres.

14. A package according to claim 13, wherein the support material is a fiber-based material or plastic support material.

15. A package according to claim 14, wherein the support material is chosen in a group comprising paper, paperboard, textiles, fabrics, non-wovens, polymers, polymer foams, and polymer films.

16. A package according to claim 14, where the support material comprises between 20 grams and 300 grams of the moisture regulating composition per square meter of the support material, and wherein the relative weight ratio between the at least one Metal-organic framework and the at least one binder is between 1:4 and 3:2.

17. A package according to claim 14, wherein the moisture regulating composition is impregnated in the support material.

18. A package according to claim 14, wherein the support material comprises a support layer made of fiber-based material or plastics material and a coating layer applied on the support layer, wherein the coating layer contains the moisture regulating composition, wherein the amount of the moisture regulating material in the support material is comprised between 20-300 grams per square meter.

19. A package according to claim 15, wherein the support material is a foamed support material having a density between 10000-900000 grams per cubic meter.

20. A package according claim 13, wherein the package comprises between 0.30 and 5.00 grams of the at least one Metal-organic framework or Metal-organic frameworks.

21. Method for preparing a package according to claim 13, wherein the method comprises the following steps:

c) preparing the packaging element, wherein preparing the packaging element comprises the following steps:

c-i) providing the support material;

c-ii) providing an impregnating bath of a moisture regulating solution containing the moisture regulating composition and a solvent;

c-iii) immersing the support material into the impregnating bath until the support material is impregnated with the solution of the impregnating bath; and c-iv) drying the support material to evaporate the solvent from the support material so as to obtain a support material comprising the at least one Metal-organic framework exhibiting a moisture content which would be in equilibrium at the temperature of 23 Celsius and the pressure of 1 atmosphere with a mixture air-water characterized by a relative humidity comprised between about 0 and 25 percent, according to the corresponding sorption isotherm of the at least one Metal-organic framework; and d) inserting at least a portion of the packaging element into the package.

22. Method for preparing a package according to claim 13, wherein the method comprises the following steps:

c1) preparing the packaging element, wherein preparing the packaging element comprises the following steps:

c1-i) providing the support material;

c1-ii) providing an impregnating bath of a moisture regulating solution containing the moisture regulating composition and a solvent;

c1-iii) immersing the support material into the impregnating bath until the support material is impregnated with the solution of the impregnating bath and c1-iv) drying the support material to evaporate the solvent from the support material so as to obtain a support material comprising the at least one Metal-organic framework exhibiting a moisture content comprised between about 0 weight percent and 25 weight percent based on the weight of the at least one Metal-organic framework without water; and d1) inserting at least a portion of the packaging element into the package.

23. Method according to claim 22 and further comprising after step c1-iii) and before step c1-iv) the following step:

feeding the support material impregnated with the solution of the impregnating bath to metering rolls to remove excess solution from the support.

24. Method according to claim 22, wherein the support material is a web of support material that it continuously supplied to the impregnating bath.

\*    \*    \*    \*    \*